(12) United States Patent
Arimitsu et al.

(10) Patent No.: US 6,624,601 B2
(45) Date of Patent: Sep. 23, 2003

(54) CONTROL DEVICE FOR PLURALITY OF ROTATING ELECTRICAL MACHINES

(75) Inventors: Minoru Arimitsu, Yokosuka (JP); Masaki Nakano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/940,546

(22) Filed: Aug. 29, 2001

(65) Prior Publication Data

US 2002/0057065 A1 May 16, 2002

(30) Foreign Application Priority Data

Oct. 16, 2000 (JP) .......................... 2000-315735

(51) Int. Cl.[7] .............. H02P 7/74; H02P 7/80
(52) U.S. Cl. ............. 318/34; 318/43; 318/49; 318/432; 318/434; 318/439; 318/800; 318/801; 318/811; 318/815; 310/114
(58) Field of Search ............. 318/34, 43, 49, 318/432, 439, 815, 801, 811, 800, 434; 310/114

(56) References Cited

U.S. PATENT DOCUMENTS 5,365,153 A * 11/1994 Fujita et al. ............... 318/34

5,917,248 A * 6/1999 Seguchi et al. ............ 290/31
6,376,955 B1 * 4/2002 Arimitsu .................. 310/114

FOREIGN PATENT DOCUMENTS

| EP | 1199210 A2 | * 9/2001 | ........... B60L/11/18 |
| JP | 10-331675 | * 12/1998 | |
| JP | 11-275826 | 10/1999 | |
| JP | 2001-169516 | * 6/2001 | |
| JP | 2001-258218 | * 9/2001 | |

* cited by examiner

Primary Examiner—Robert E. Nappi
Assistant Examiner—Tyrone Smith
(74) Attorney, Agent, or Firm—Foley & Lardner

(57) ABSTRACT

A control device for a plurality of rotating electrical machines has a single current control device with an inverter, gate driver, and a motor controller, which supplies a control current to each rotating electrical machine allowing rotation control in response to the rotational phase of the rotor. In this control device, the current control device determines the control current of each rotating electrical machine based on the target torques and rotational angular velocities of all rotating electrical machines, and supplies a composite current obtained by combining the determined control currents for each rotating electrical machine to all rotating electrical machine.

In this control device for a plurality of rotating electrical machines, the required voltage does not exceed the voltage of the power source and the peak value of the composite current does not exceed the permitted range of the inverter.

9 Claims, 8 Drawing Sheets

CONTROL DEVICE FOR PLURALITY OF ROTATING ELECTRICAL MACHINES

FIELD OF THE INVENTION

This invention relates to a control device for a plurality of rotating electrical machines.

BACKGROUND OF THE INVENTION

Tokkai-Hei-11-275826 published by the Japanese Patent Office in 1999 discloses a control device for a plurality of synchronous motors supplying a composite current obtained by combining control currents which flow in accordance with the rotational phases of respective rotors. The composite current is supplied to a plurality of synchronous motors from a single inverter in order to perform independent control of the rotation of a plurality of synchronous motors with a single inverter.

SUMMARY OF THE INVENTION

However, for this type of device, a sufficient attention has not been paid to how to supply a control current flowing in each rotating electrical machine (motor). For example, in order to optimize the control current to each rotating electrical machine, this device determines a control current for each rotating electrical machine independently of each other, based on a target torque and a rotation speed of each rotating electrical machine.

In this manner, the device minimizes the control current average value of each rotating electrical machine. Thereafter, the device supplies a composite current resulting from the combination of these control currents from a single current control device. However in this case, the possibility exists that the required voltage may exceed the voltage of the power source or that the peak value of the composite current may exceed the permitted range for the device.

It is therefore an object of this invention to provide a control device for a plurality of rotating electrical machines which is capable of optimizing a composite current obtained by combining the control currents to each rotating electrical machine based on the target torques and rotation speeds of all rotating electrical machines, and which supplies all the rotating electrical machines with a composite current obtained by combining the control currents to each rotating electrical machine.

In order to achieve above object, this invention provides a control device for a plurality of rotating electrical machines, the control device comprising an inverter connected to the plurality of rotating electrical machines, a sensor for detecting a rotational angular velocity and rotational phase of the rotor in each rotating electrical machine, and a controller.

The controller functions to determine a control current of each rotating electrical machine based on the target torques of all rotating electrical machines and the rotational angular velocities of all rotating electrical machines, and control the inverter to supply a composite current which is the combination of the control currents for each rotating electrical machine to all rotating electrical machines.

The details as well as other features and advantages of this invention are set forth in the remainder of the specification and are shown in the accompanying drawings.

DESCRIPTION OF THE PREFERRED EMBODIMENTS

Figure 1:
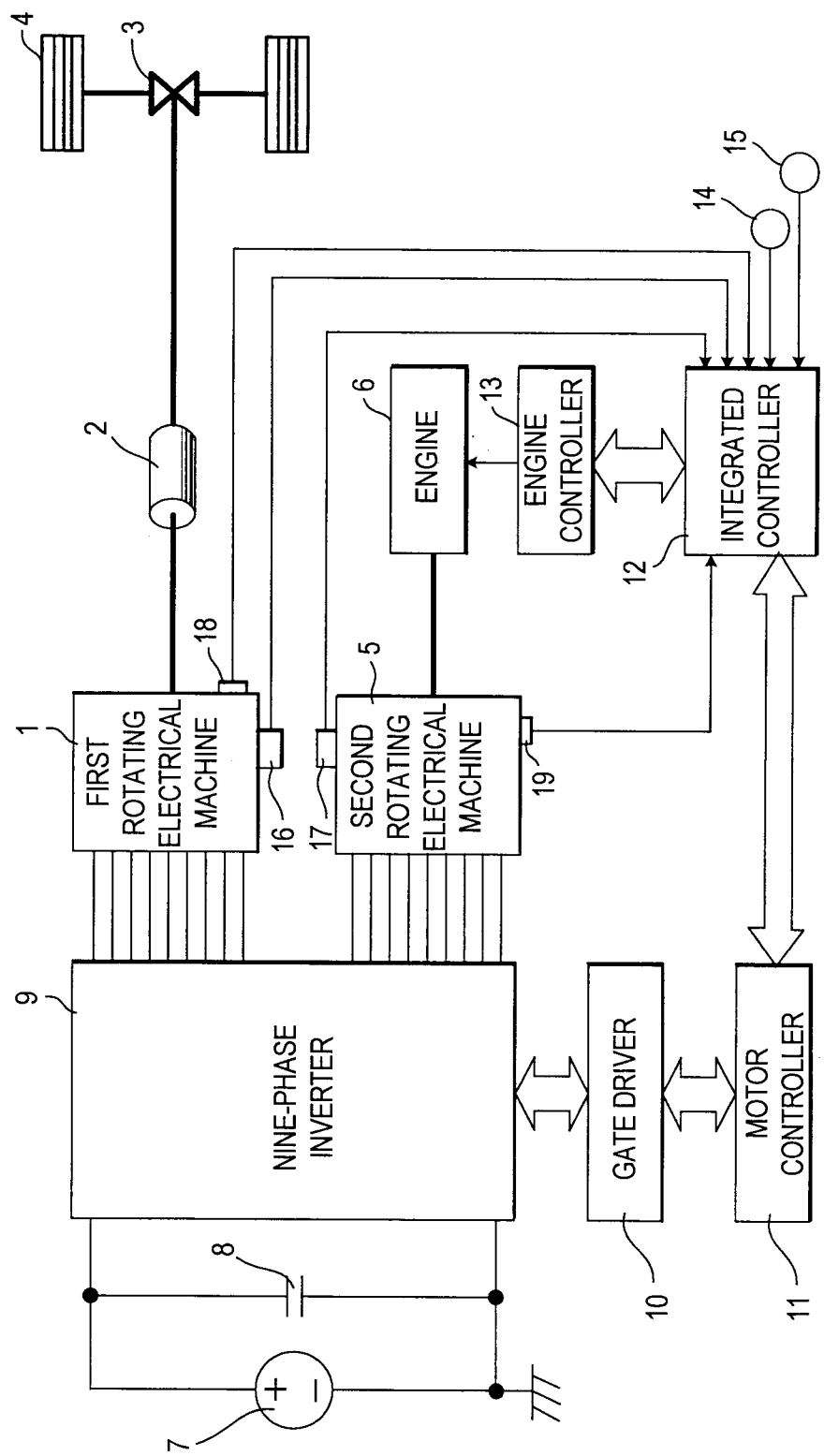
FIG. 1 is a schematic diagram of a control device for a plurality of rotating electrical machines according to the present invention.
Figure 2:
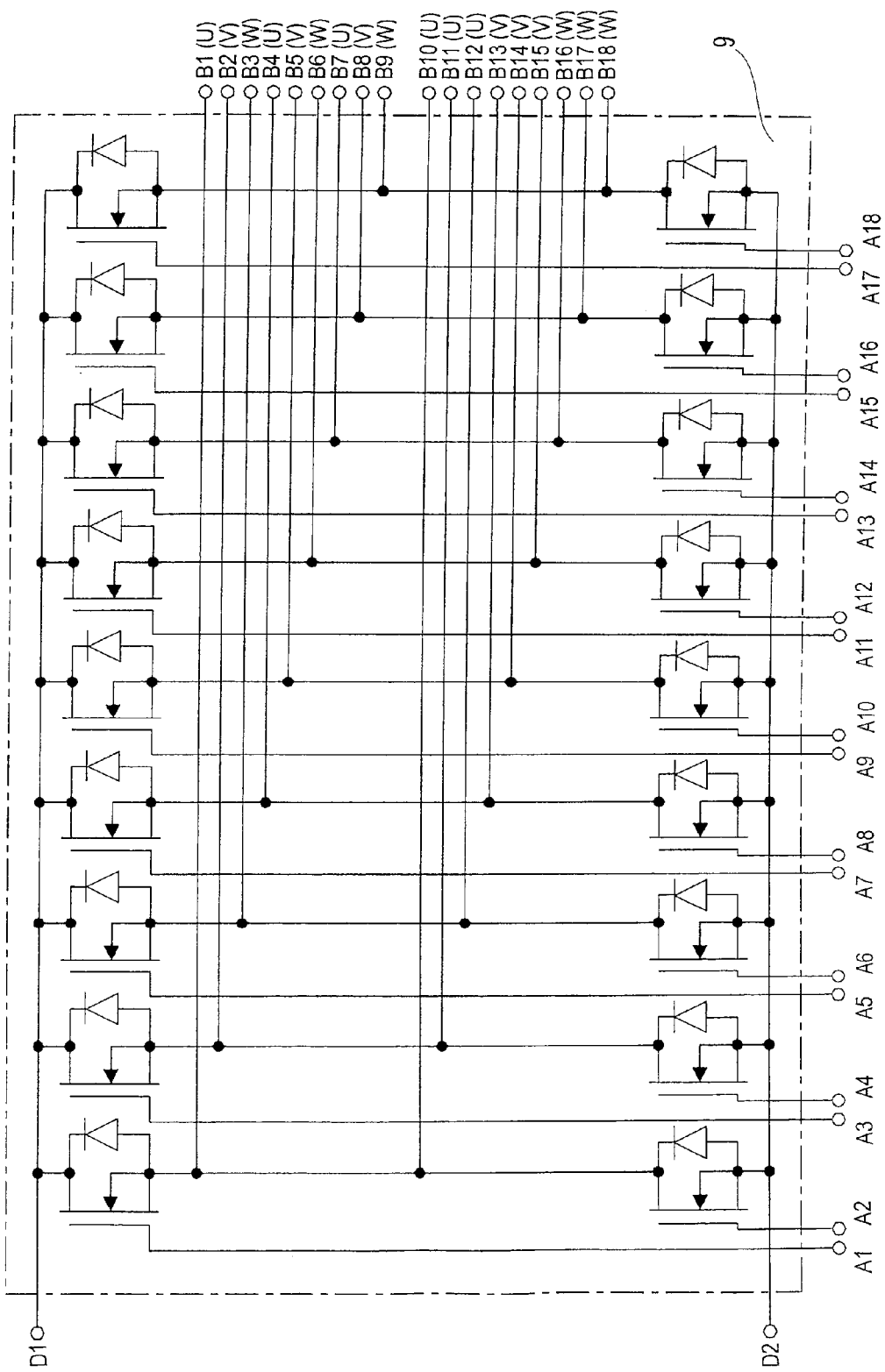
FIG. 2 is a schematic circuit diagram of an inverter for a control device according to this invention.
Figure 3:
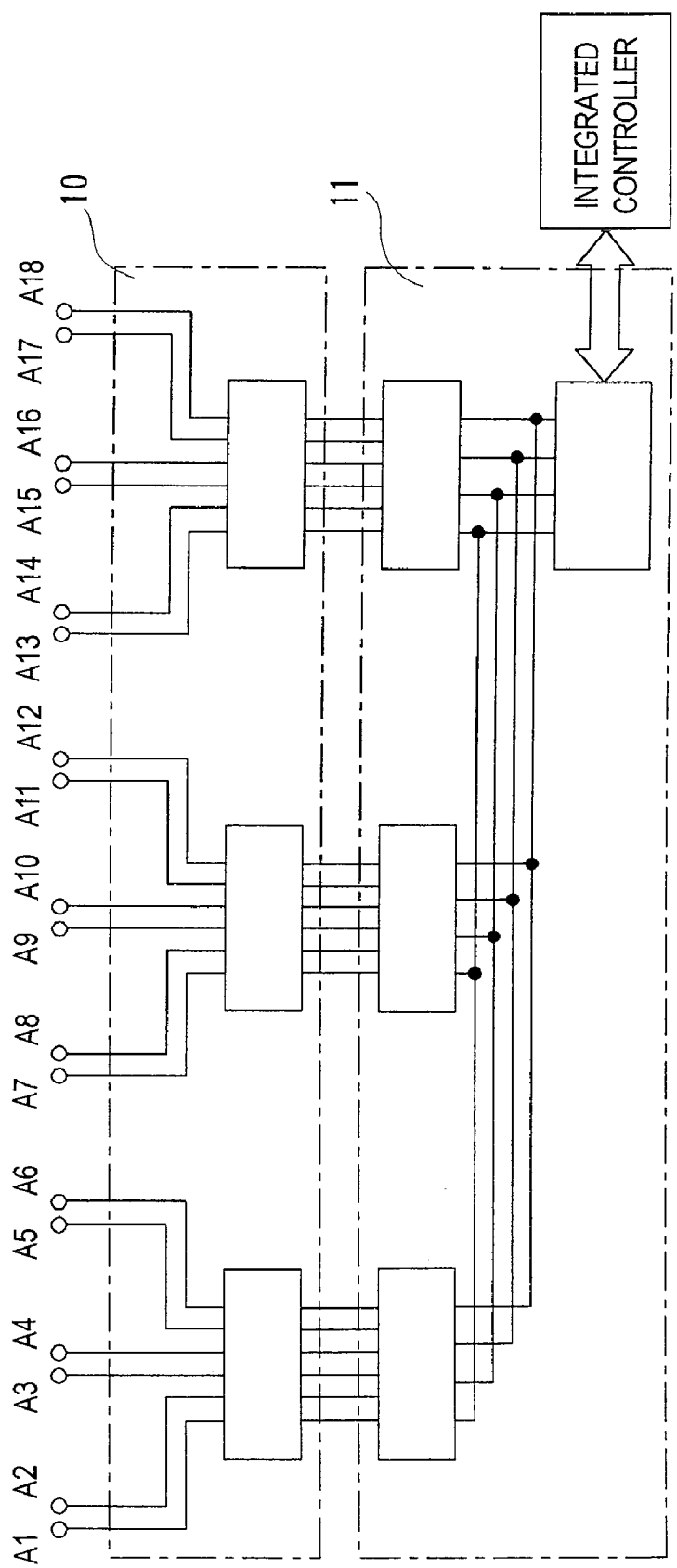
FIG. 3 shows the connections of a motor controller and a gate driver for a control device according to this invention.

A control device for a plurality of rotating electrical machines according to this invention will be described below with reference to FIG. 1, FIG. 2 and FIG. 3. Reference numeral 1 denotes an interior permanent magnet (IPM) type of rotating electrical machine (hereafter referred to as "first rotating electrical machine") which comprises a rotor with three pairs of magnetic poles and a nine-phase stator, and which is driven by a three-phase alternating control current.

Figure 4:
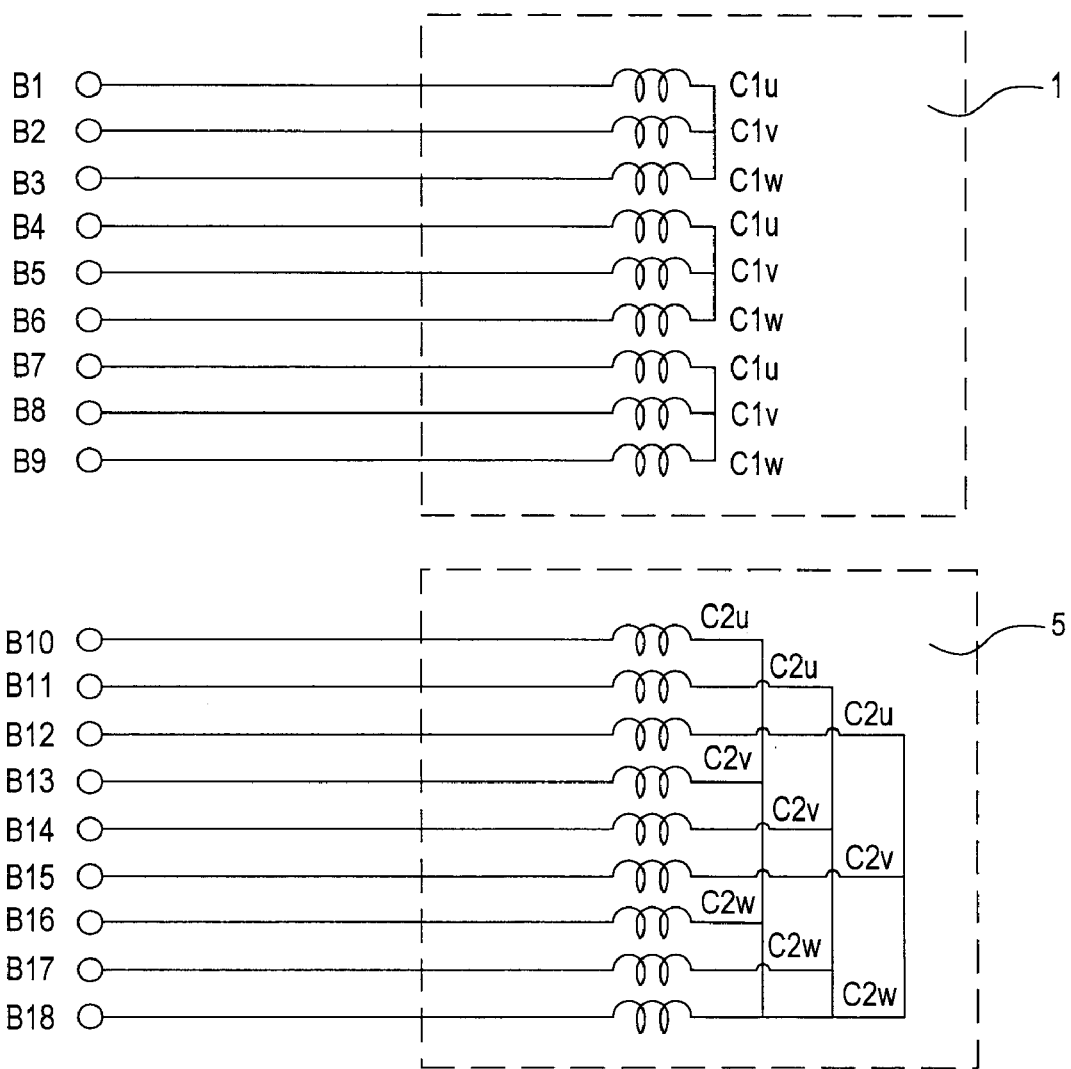
FIG. 4 shows an arrangement of the coil windings, according to one embodiment of the present invention.

Referring to FIG. 4, the nine-phase stator coil of the first rotating electrical machine 1 is made up of a triplet of three-phase coils (three 3-phase coils). The three-phase coil windings (C1u, C1v, C1w) are connected in a star connection. Also, the three-phase coil windings (C1u, C1v, C1w) may be connected in a delta connection. The first rotating electrical motor is connected to the drive wheels 4 through a reduction gear set 2 and a differential gear 3, and mainly operates as a motor.

Reference numeral 5 denotes an interior permanent magnet (IPM) type of rotating electrical machine (hereafter referred to as "second rotating electrical machine") comprising a rotor with three pairs of magnetic poles and a nine-phase stator. A three-phase alternating control current drives the second rotating electrical machine 5. Referring to FIG. 4, the nine-phase stator coil of the second rotating electrical machine 5 is made up of a triplet of three-phase coils (three 3-phase coils). The three-phase coil windings (C2u, C2v, C2w) are connected in a star connection. Also, the three-phase coil windings (C2u, C2v, C2w) may be connected in a delta connection.

This rotating electrical motor is connected to the engine 6. Although the second rotating electrical motor 5 also operates as a motor, it mainly operates as a generator which generates three-phase alternating current.

A nine-phase inverter 9 for converting the direct current from the battery 7 (that is to say, from the direct-current (DC) power source) to an alternating current is connected to both of the rotating electrical machines 1, 5, in order to supply the three-phase alternating control current to the stator coils of both of the rotating electrical machines 1, 5. As shown in detail in FIG. 2, the inverter 9 is a normal bridge-type inverter modified to nine-phases.

The inverter 9 is provided with eighteen transistors and an equal number of diodes as switching elements. Insulated Gate Bipolar Transistors (IGBT) are used as transistors. As shown on the lower side of FIG. 2, the inverter 9 has terminal groups (A1–A18) connected to a gate driver 10 which turns the transistor groups ON and OFF. As shown on the right side of FIG. 2, the inverter 9 has terminal groups (B1–B9) connected to the first rotating electrical machines 1, and terminal groups (B10–B18) connected to the second rotating electrical machines 5. The terminals (D1 and D2) on the left side of FIG. 2 are connected to a condenser 8.

A three-phase coil is connected to each of the terminal groups (B1, B2, B3), (B4, B5, B6), (B7, B8, B9), (B10, B13, B16), (B11, B14, B17) and (B12, B15, B18), as shown in FIG. 4. The three-phase coil windings of both the rotating electrical machines have an arrangement wherein the three-phase control current for one of the rotating electrical machine cannot flow in other rotating electrical machine.

The nine-phase composite current flowing in the inverter 9 results from the combination of the first three-phase control current (I1$u$, I1$v$, I1$w$) for driving the first rotating electrical machine 1 and the second three-phase control current (I2$u$, I2$v$, I2$w$) for driving the second rotating electrical machine 5. The nine-phase composite current for the arrangement of the nine-phase stator coil in FIG. 4 is represented as (I1$u$+I2$u$, I1$v$+I2$u$, I1$w$+I2$u$, I1$u$+I2$v$, I1$v$+I2$v$, I1$w$+I2$v$, I1$u$+I2$w$, I1$v$+I2$w$, I1$w$+I2$w$).

The first three-phase control current (I1$u$, I1$v$, I1$w$) has the same phase for the three-phase coil windings (C2$u$, C2$v$, C2$w$) of the second rotating electrical machine 5. Similarly, the second three-phase control current (I2$u$, I2$v$, I2$w$) has the same phase for the three-phase coil windings (C1$u$, C1$v$, C1$w$) of the first rotating electrical machine 1. Therefore, the first three-phase control current (I1$u$, I1$v$, I1$w$) does not flow in the three-phase coil windings of the second rotating electrical machine 5, and similarly the second three-phase control current (I2$u$, I2$v$, I2$w$) does not flow in the three-phase coil windings of the first rotating electrical machine 1.

The ON and OFF signals applied to each gate (base of the transistor) of the inverter 9 is a PWM signal. Each rotating electrical machine 1, 5 is provided with a rotation angle sensor 18, 19 for detecting the rotational angular velocity and the rotational phase of the rotor of each rotating electrical machine 1, 5. Signals from these sensors are input to the motor controller 11. The motor controller 11 generates PWM signals based on data (hereafter referred to as "target torque commands") with respect to the target torques (positive and negative possible) of all rotating electrical machine 1, 5.

The current control device comprises an inverter 9, a motor controller 11 and a gate driver 10. The motor controller 11 is provided with a first microprocessor which has a central processing unit (CPU), a random access memory (RAM), a read-only memory (ROM) and an input/output interface (I/O interface).

Also, the integrated controller 12 is provided with a second microprocessor which has a central processing unit (CPU), a random access memory (RAM), a read-only memory (ROM) and an input/output interface (I/O interface).

The second microprocessor determines a target torque $\tau 1$ and rotational angular velocity $\omega 1$ of the first rotating electrical machine 1, a target torque $\tau 2$ and target rotational angular velocity $\omega 2$ of the second rotating electrical machine 5, and a target torque Te and target rotation speed Ne of the engine 6, based on the engine throttle opening APO obtained from the output signal of the engine throttle opening sensor 15 and the vehicle speed VSP obtained from the output signal from the vehicle speed sensor 14.

Figure 5:
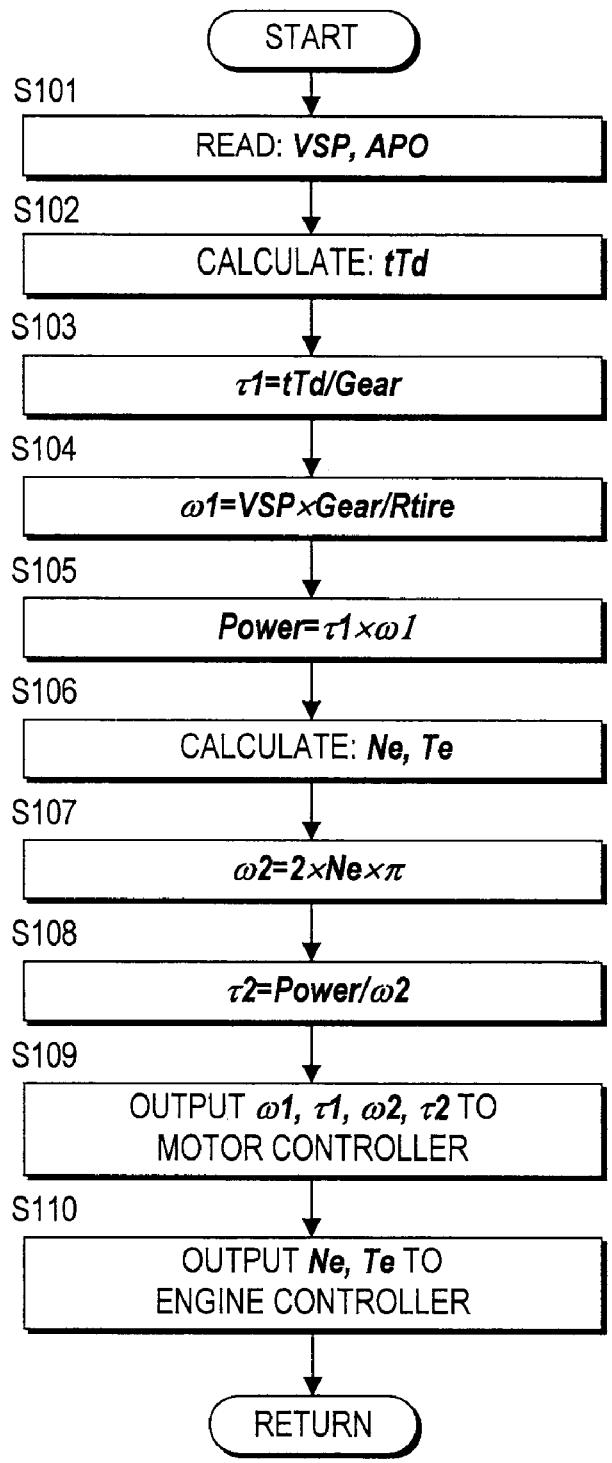
FIG. 5 is a flowchart describing the determination process for the target torque and rotational angular velocity of each rotating electrical machine according to the present invention.

A program related to the above process will be described below with reference to the flowchart in FIG. 5. This program is stored in the ROM of the second microprocessor of the integrated controller 12 and is executed by the second microprocessor at a fixed time interval of 10 milliseconds for example.

Figure 6:
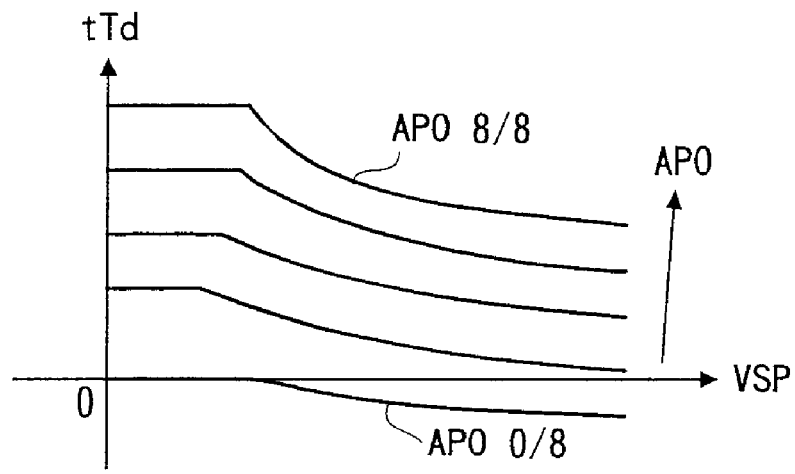
FIG. 6 is a map specifying the relation between the vehicle speed and the target torque of the axle mounted with the vehicle wheels.

In a step S101, the vehicle speed VSP and the engine throttle opening APO are read. For example, the engine throttle opening APO takes a value from 0/8–8/8. These values are used in a step S102 to calculate a target torque tTd of the axle mounted with the drive wheels on the basis of a first map shown in FIG. 6. The ROM of the second microprocessor stores the first map.

In a step S103, a target torque $\tau 1$ of the first rotating electrical machine 1 is calculated by dividing the target torque tTd of the axle mounted with the drive wheels by the overall braking ratio Gear of the reduction gear set 2 and the differential gear 3.

In a step S104, the rotational angular velocity $\omega 1$ of the first rotating electrical machine 1 is calculated from the equation below.

$$\omega 1 = VSP \times Gear / Rtire$$

where Rtire is the radius of drive wheel.

In a step S105, the product of the rotational angular velocity $\omega 1$ and the target torque $\tau 1$ is calculated as the drive output Power of the first rotating electrical machine 1.

Figure 7:
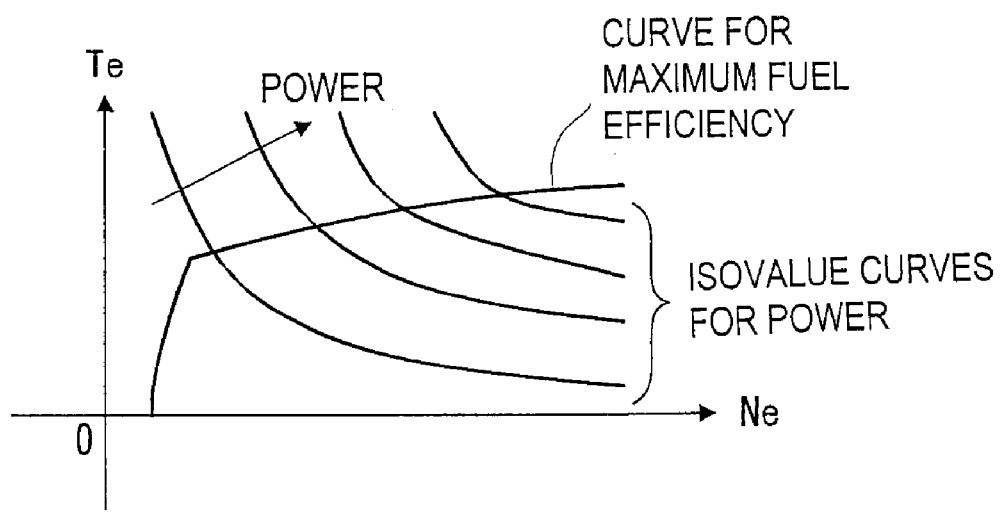
FIG. 7 is a map specifying the relation between the target engine torque and target engine rotation speed when the engine is generating an output at an optimal fuel efficiency.

In a step S106, a target rotation speed Ne and a target torque Te of the engine to achieve the drive output Power are calculated from by looking up a second map as shown in FIG. 7. These values of Ne and Te show the engine rotation speed and engine torque at optimal fuel consumption when operating at the drive output Power. The second map is stored in the ROM of the second microprocessor.

In a step S107, a target rotational angular velocity $\omega 2$ of the second rotating electrical machine 5 is calculated from the equation below based on the target rotation speed Ne for the engine.

$$\omega 2 = 2 \times Ne \times \pi$$

In a step S108, a target torque $\tau 2 (= Te)$ of the second rotating electrical machine 5 is calculated from the equation below based on the angular velocity $\omega 2$ and the drive output Power.

$$\tau 2 = Power / \omega 2$$

The drive output Power is used as a required generated power for the second rotating electrical machine 5.

In a step S109, a target torque $\tau 1$ of the first rotating electrical machine 1, a target rotational angular velocity $\omega 1$ of the first rotating electrical machine 1, a target torque $\tau 2$ of the second rotating electrical machine 5, and a target rotational angular velocity $\omega 2$ of the second rotating electrical machine 5 calculated as above are output to the motor controller 11. In a step S110, the engine target rotation speed Ne and the engine target torque Te are output to the engine controller 13.

Referring again to FIG. 1, in addition to the four values ($\omega 1$, $\tau 1$, $\omega 2$, $\tau 2$) from the integrated controller 12, the temperatures T1, T2 of each rotating electrical machine 1, 5 detected by the temperature sensors 16, 17 are input to the motor controller 11 through the integrated controller 12. It is preferred that the temperature sensors 16, 17 detect a temperature of the stator coils of each rotating electrical machine 1, 5.

Command values for a d-axis current and q-axis current of each rotating electrical machine 1, 5 are determined by a known current vector control. The d-q axis is a rotation coordinate which rotates together with the rotor. The motor controller 11 compares the temperature T1 of the first rotating electrical machine 1 and the temperature T2 of the second rotating electrical machine 5 with a permitted temperature Tth. The command values for the d-axis current and the q-axis current of each rotating electrical machines 1, 5 are determined on the basis of the comparison.

Figure 8:
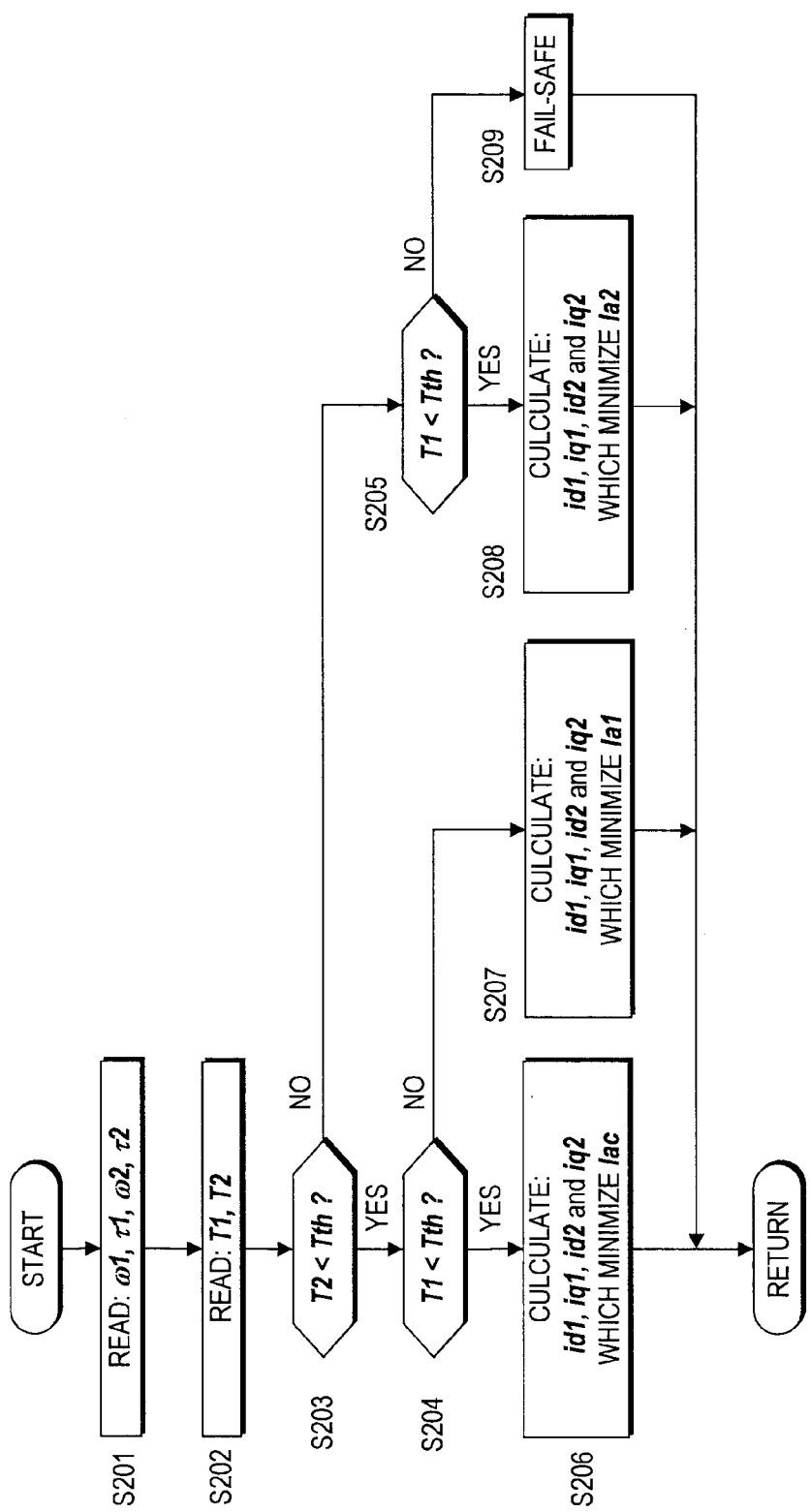
FIG. 8 is a flowchart describing the process for determining command values of a control current for each rotating electrical machine, according to the present invention.

Referring to the flowchart in FIG. 8, the program executing this process will be described. This program determines the command value of the d-axis current and q-axis current of each rotating electrical machine 1, 5 (the control current of each rotating electrical machine). The program is stored in the ROM of the first microprocessor in the motor controller 11 and is executed by the first microprocessor of the motor controller 11 at a fixed time interval, for example, 10 milliseconds.

In a step S201, the four values from the integrated controller 12 (that is to say, the target torque τ1 and rotational angular velocity ω1 of the first rotating electrical machine 1, and the target torque τ2 and target rotational angular velocity ω2 of the second rotating electrical machine 5) are read.

In a step S202, the first rotating electrical machine temperature T1 and the second rotating electrical machine temperature T2 are read. In steps S203, S204, S205, the first rotating electrical machine temperature T1 and the second rotating electrical machine temperature T2 are compared with the permitted temperature Tth (for example a fixed value).

In the step S203, it is determined whether or not the second rotating electrical machine temperature T2 is smaller than the permitted temperature Tth. When the second rotating electrical machine temperature T2 is smaller than the permitted temperature Tth, the program proceeds to the step S204 where it is determined whether or not the first rotating electrical machine temperature T1 is smaller than the permitted temperature Tth. In the step S203, when the result of the determination is negative, the program proceeds to the step S205, and in the same manner as the step S204, it is determined whether or not the first rotating electrical machine temperature T1 is smaller than the permitted temperature Tth.

If the temperatures T1, T2 of both rotating electrical machines are lower than the permitted temperature Tth, the program proceeds to a step S206. In the step S206, a control current of each rotating electrical machine 1, 5 is determined so that the average current value Iac of the composite current Ic combining the control currents of each rotating electrical machine 1, 5 is minimized. In this manner, it is possible to minimize copper loss in sections of the circuit in which a composite current flows. Furthermore it is possible to minimize switching loss in the switching elements. As a result, it is possible to improve the overall efficiency of the rotating electrical machine system.

More precisely, the current command values (the d-axis current command value id1 and q-axis current command value iq1 of the first rotating electrical machine 1 and the d-axis current command value id2 and q-axis current command value iq2 of the second rotating electrical machine 5), which minimize the performance function in Equation 9, are determined under the limiting conditions expressed by the following equations 1–8.

$$vd1 = -\omega 1 \times Lq1 \times iq1 \tag{1}$$

where vd1 is the d-axis voltage of the first rotating electrical machine, and Lq1 is the q-axis inductance of the first rotating electrical machine.

$$vq1 = \omega 1 \times Ld1 \times id1 + \omega 1 \times \phi 1 \tag{2}$$

where vq1 is the q-axis voltage of the first rotating electrical machine, Ld1 is the d-axis inductance of the first rotating electrical machine, and φ1 is the magnetic flux of the first rotating electrical machine.

$$\tau 1 = p1 \times (\phi 1 \times iq1 + (Ld1 - Lq1) \times id1 \times iq1) \tag{3}$$

where p1 is the number of magnetic pole pairs of the first rotating electrical machine.

$$vd2 = -\omega 2 \times Lq2 \times iq2 \tag{4}$$

where vd2 is the d-axis voltage of the second rotating electrical machine, and Lq2 is the q-axis inductance of the second rotating electrical machine.

$$vq2 = \omega 2 \times Ld2 \times id2 + \omega 2 \times \phi 2 \tag{5}$$

where vq2 is the q-axis voltage of the second rotating electrical machine, Ld2 is the d-axis inductance of the second rotating electrical machine, and φ2 is the magnetic flux of the second rotating electrical machine.

$$\tau 2 = p2 \times (\phi 2 \times iq2 + (Ld2 - Lq2) \times id2 \times iq2) \tag{6}$$

where p2 is the number of magnetic pole pairs the second rotating electrical machine.

$$V0^2 \geq vd1^2 + vq1^2 + vd2^2 + vq2^2 \tag{7}$$

where V0 is the upper limiting value on the phase voltage. Equation 7 limits the voltage of one phase of the three-phase alternating current to a value V0 so that the voltage required for control of the motor/generator does not exceed the power source voltage.

$$I0^2 \geq id1^2 + iq1^2 + id2^2 + iq2^2 \tag{8}$$

where I0 is the upper limiting value on the phase current. Equation 8 is adapted so that the phase current does not exceed an upper limiting value which is the permitted current value of the switching elements comprising the inverter.

$$J = k \times (SQRT(id1^2 + iq1^2) + SQRT(id2^2 + iq2^2)) \tag{9A}$$

$$k = f(SQRT(id1^2 + iq1^2)/SQRT(id2^2 + iq2^2)) \tag{9B}$$

where J is a performance function and displays a one-to-one correspondence with the average current value Iac of the composite current. k is a coefficient taking into account the effect of reducing the average current value due to combining current.

The performance function J in Equation 9 above is derived as follows.

Although the three-phase alternating current is represented as three sinusoidal waves having different phases in each rotating electrical machine, the current I of only one phase of the control current of the three-phase alternating current is expressed by the following Equation.

$$I = Ip \times \sin(\omega t)$$

where Ip is the current peak value, ω is the angular velocity, and t is time.

The average current value of the control current I is obtained from the following Equation.

$$Ia = 2 \times Ip/\pi$$

Since the length of the current vector represents the size of the current peak value on the d-q axis plane, the following relation is established.

$$Ia = 2 \times SQRT(id^2 + iq^2)/\pi$$

Thus when $id^2 + iq^2$ on the right side of the equation is reduced to a minimum value, the average current value of the control current I is minimized. Here, $SQRT(id^2 + iq^2)$ represents $(id^2 + iq^2)^{1/2}$.

According to the research of the present inventors, the average current value Iac of the composite current Ic (=I1+I2) which is the combination of the control current (one phase) I1 of the first rotating electrical machine and the control current (one phase) I2 of the second rotating electrical machine is smaller than the sum Ia1+Ia2 of the average current value of each current I1, I2 before combining the currents. The reduction ratio is determined according to the ratio Ip1/Ip2 of the size of the current peak value of each current I1, I2 before combining the currents.

To describe this in further detail, the coefficient k is defined in the following Equation.

$$k = Iac/(Ia1 + Ia2)$$

This coefficient is expressed in the following Equation.

$$k = f(Ip1/Ip2)$$
$$= f(SQRT(id1^2 + iq1^2)/SQRT(id2^2 + iq2^2))$$

The average current value Iac of the composite current Ic is expressed in the following Equation using the coefficient k.

$$Iac = 2 \times k \times (SQRT(id1^2 + iq1^2) + SQRT(id2^2 + iq2^2))/\pi$$

The right-side half of the equation is the performance function J of Equation 9.

When the temperature T1 of the first rotating electrical machine 1 is greater than or equal to the permitted temperature Tth although the temperature T2 of the second rotating electrical machine 5 is less than the permitted temperature Tth, the program proceeds to a step S207 through the steps S203 and S204.

In the step S207, the control current of each rotating electrical machine 1, 5 is determined so that the average current value Ia1 of the control current I1 of the first rotating electrical machine 1 is minimized. More precisely, the current command values (the d-axis current command value id1 and q-axis current command value iq1 of the first rotating electrical machine 1 and the d-axis current command value id2 and q-axis current command value iq2 of the second rotating electrical machine 5), which minimize the performance function J in Equation 10, are determined to take into account the limiting conditions expressed by Equations 1–8.

$$J = id1^2 + iq1^2 \tag{10}$$

Thus when it is detected that the temperature of the first rotating electrical machine 1 is increasing, it is possible to suppress temperature increases in the first rotating electrical machine 1 by minimizing the average current value of the control current of the first rotating electrical machine 1.

In the same manner, when the temperature T2 of the second rotating electrical machine 5 is greater than or equal to the permitted temperature Tth although the temperature T1 of the first rotating electrical machine 1 is less than the permitted temperature Tth, the program proceeds to a step S208 through the steps S203 and S205.

In the step S208, the control current of each rotating electrical machine is determined so that the average current value Ia2 of the control current I2 of the second rotating electrical machine 5 is minimized. More precisely, the current command values (the d-axis current command value id1 and q-axis current command value iq1 of the first rotating electrical machine 1 and the d-axis current command value id2 and q-axis current command value iq2 of the second rotating electrical machine 5) which minimize the performance function J of Equation 11 are determined, satisfying the limiting conditions of Equations 1–8.

$$J = id2^2 + iq2^2 \tag{11}$$

Thus, when it is detected that the temperature T2 of the second rotating electrical machine 5 is increasing, it is possible to suppress temperature increases in the second rotating electrical machine 5 by minimizing the average current value of the control current of the second rotating electrical machine 5.

On the other hand, when both temperatures T1, T2 of the two rotating electrical machines 1, 5 is greater than or equal to the permitted temperature Tth, the program proceeds to a step S209 through the steps S203 and S205 and executes a fail-safe. The fail-safe is a process for forcibly reducing the output or the generated power of both rotating electrical machines 1, 5. In this manner, when it is detected that the temperature of both rotating electrical machines is increasing, it is possible to suppress temperature increases in both rotating electrical machines.

In the present invention, as shown above, the d-axis current command values id1 and id2 and the q-axis current command values iq1 and iq2 of each rotating electrical machine 1, 5 are determined based on the target torques τ1, τ2 and rotational angular velocities ω1, ω2 of all the rotating electrical machines 1, 5. In this manner, in a control device for a plurality of rotating electrical machines which supplies a composite current from a single current control device, it is possible to prevent the peak value of the composite current from exceeding a permitted range in the current control device, and the required voltage from exceeding the battery voltage.

After determining the current command values of the three-phase alternating control current of each rotating electrical machine 1, 5 in this manner, the actual d-axis current and q-axis current is calculated from the output signal of the rotation angle sensor 18, 19 of each rotating electrical machine 1, 5 and the detection signal of a current sensor (not shown). A correction is calculated in order to make the actual d-axis current and q-axis current coincide with the d-axis and q-axis command values, respectively.

The voltage command value of the three-phase alternating current of the rotating electrical machines 1, 5 is generated by performing a two-phase to three-phase coordinate conversion on the correction. The voltage command value of each rotating electrical machine is combined in order to generate a composite voltage command value. A PWM signal is generated by the gate driver 10 from a composite voltage command value and a carrier signal. The PWM signal is transmitted to the inverter 23.

On the other hand, the engine controller 13 controls the air intake amount, fuel injection amount and ignition timing so that the torque and rotation speed of the engine coincides with a target engine torque Te and a target rotation speed Ne.

Figure 9:
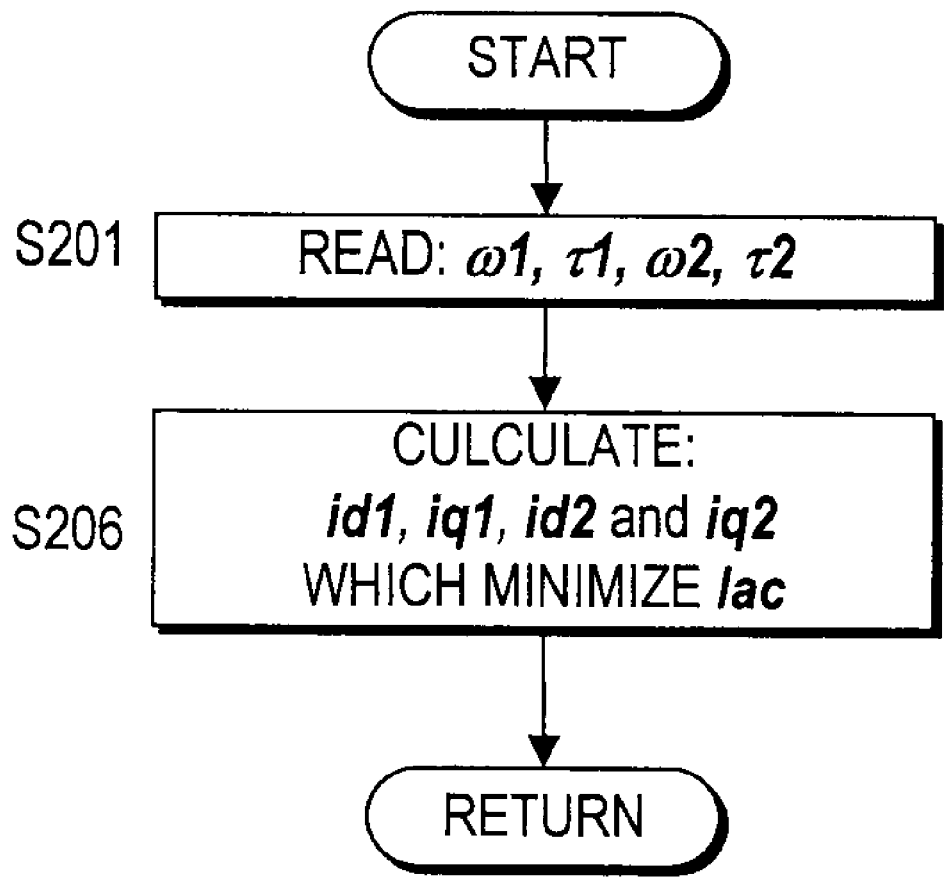
FIG. 9 is a flowchart describing the process for determining command values of a control current for each rotating electrical machine, according to the second embodiment.

Next, referring to FIG. 9, a second embodiment relating to the present invention will now be described. The second embodiment is applied to all types of arrangement of the three-phase coil windings of the stators. Namely, the arrangement of the three-phase coil windings is not limited to the arrangement wherein the three-phase control current for one of the rotating electrical machine cannot flow in other rotating electrical machine.

At all times, a control current of each rotating electrical machine 1, 5 is determined so that the average current value Iac of the composite current Ic combining the control currents of each rotating electrical machine 1, 5 is minimized.

In the second embodiment, the step S201 and the subsequent step S206 are performed in the same manner as the first embodiment.

The entire contents of Japanese Patent Applications P2000-315735 (filed Oct. 16, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A control device for a plurality of rotating electrical machines, comprising:
    an inverter connected to the plurality of rotating electrical machines;
    a sensor for detecting a rotational angular velocity and a rotational phase of a rotor in each rotating electrical machine; and
    a motor controller configured to:
        determine a control current of each rotating electrical machine based on target torques of all of the plurality of rotating electrical machines and the rotational angular velocities of all of the plurality of rotating electrical machines;
        control the inverter to supply a composite current to all of the plurality of rotating electrical machines, the composite current being a combination of the control currents for each rotating electrical machine; and
        determine the control current of each rotating electrical machine so that an average current value of the composite current takes a minimum value, while maintaining the target torques of all of the plurality of rotating electrical machines.

2. A control device for a plurality of rotating electrical machines, comprising:
    an inverter connected to the plurality of rotating electrical machines;
    a sensor for detecting a rotational angular velocity and a rotational phase of a rotor in each rotating electrical machine; and
    a motor controller configured to:
        determine a control current of each rotating electrical machine based on target torques of all of the plurality of rotating electrical machines and the rotational angular velocities of all of the plurality of rotating electrical machines;
        control the inverter to supply a composite current to all of the plurality of rotating electrical machines, the composite current being a combination of the control currents for each rotating electrical machine; and
        determine the control current of each rotating electrical machine so that the average value of the control current of a specific rotating electrical machine takes a minimum value, while maintaining the target torques of all of the plurality of rotating electrical machines.

3. A control device for a plurality of rotating electrical machines, comprising:
    an inverter connected to the plurality of rotating electrical machines;
    a sensor for detecting a rotational angular velocity and a rotational phase of a rotor in each rotating electrical machine; and
    a motor controller configured to:
        determine a control current of each rotating electrical machine based on target torques of all of the plurality of rotating electrical machines and the rotational angular velocities of all of the plurality of rotating electrical machines; and
        control the inverter to supply a composite current to all of the plurality of rotating electrical machines, the composite current being a combination of the control currents for each rotating electrical machine; and
    wherein the controller has a plurality of means for determining the control current for each rotating electrical machine, and selectively switches the use of the plurality of means in accordance with conditions of the plurality of rotating electrical machines.

4. The control device for a plurality of rotating electrical machines as defined by claim 2, further comprising a sensor for detecting a temperature of each rotating electrical machine,
    wherein the controller further functions to determine the control current of each rotating electrical machine so that the average value of the control current of a rotating electrical machine, whose temperature has exceeded a permitted temperature, takes a minimum value.

5. The control device for a plurality of rotating electrical machine as defined by claim 1,
    wherein the controller comprises a microprocessor.

6. The control device for a plurality of rotating electrical machines as defined by claim 1, further comprising a sensor for detecting a temperature of each rotating electrical machine,
    wherein the controller minimizes the average current value of the composite current when the temperatures of all rotating electrical machines are lower than a permitted temperature.

7. The control device for a plurality of rotating electrical machines as defined by claim 3, wherein a plurality of means for determining the control current for each rotating electrical machine comprises a first means for minimizing the average current value of the composite current and a second means for minimizing the average value of the control current of a specific rotating electrical machine.

8. The control device for a plurality of rotating electrical machines as defined by claim 1, wherein one rotating electrical machine is connected to an engine.

9. A control device for a plurality of rotating electrical machines, comprising:
    an inverter connected to the plurality of rotating electrical machines, a sensor for detecting a rotational angular velocity and a rotational phase of the rotor in each rotating electrical machine;

a sensor for detecting a temperature of each rotating electrical machine, and a motor controller configured to:
  determine a control current of each rotating electrical machine based on target torques of all of the plurality of rotating electrical machines and the rotational angular velocities of all of the plurality of rotating electrical machines; and
  control the inverter to supply a composite current to all of the plurality of rotating electrical machines, the composite current being a combination of the control currents for each rotating electrical machine, wherein the motor controller minimizes an average current value of the composite current while maintaining the target torques of all of the plurality of electrical machines, when the temperatures of all of the plurality of rotating electrical machines are lower than a permitted temperature, and wherein the motor controller minimizes the control current of a specific rotating electrical machine while maintaining the target torques of all of the rotating electrical machines, when the temperature of a specific rotating electrical machine exceeds the permitted temperature.

* * * * *